(No Model.)  9 Sheets—Sheet 1.

W. F. DURFEE.
MACHINE FOR TRIMMING AND STAMPING HORSESHOE NAIL BLANKS.

No. 266,584. Patented Oct. 24, 1882.

Figure 1.

WITNESSES.

INVENTOR.
William F. Durfee (No Model.) 9 Sheets—Sheet 2.
W. F. DURFEE.
MACHINE FOR TRIMMING AND STAMPING HORSESHOE NAIL BLANKS.

No. 266,584. Patented Oct. 24, 1882.

Figure 2.

WITNESSES.  
INVENTOR.  
William F. Durfee (No Model.)

W. F. DURFEE.

MACHINE FOR TRIMMING AND STAMPING HORSESHOE NAIL BLANKS.

No. 266,584. Patented Oct. 24, 1882.

Figure 3.

WITNESSES.

INVENTOR.
William F. Durfee (No Model.) 9 Sheets—Sheet 5.

W. F. DURFEE.
MACHINE FOR TRIMMING AND STAMPING HORSESHOE NAIL BLANKS.

No. 266,584. Patented Oct. 24, 1882.

Figure 5.

Witnesses
Isaac Holden
George Terry

Inventor.
William F. Durfee

(No Model.)

W. F. DURFEE.

MACHINE FOR TRIMMING AND STAMPING HORSESHOE NAIL BLANKS.

No. 266,584. Patented Oct. 24, 1882.

Figure 7.

Witnesses.
Isaac Holden
George Terry

Inventor.
William F. Durfee (No Model.) 9 Sheets—Sheet 8.
W. F. DURFEE.
MACHINE FOR TRIMMING AND STAMPING HORSESHOE NAIL BLANKS.
No. 266,584. Patented Oct. 24, 1882.

WITNESSES. INVENTOR.

(No Model.)  9 Sheets—Sheet 9.

W. F. DURFEE.
MACHINE FOR TRIMMING AND STAMPING HORSESHOE NAIL BLANKS.

No. 266,584.  Patented Oct. 24, 1882.

WITNESSES
Isaac Holden
George Terry

INVENTOR
William F. Durfee

N. PETERS, Photo-Lithographer, Washington, D. C.

UNITED STATES PATENT OFFICE.

WILLIAM F. DURFEE, OF BRIDGEPORT, CONNECTICUT, ASSIGNOR TO THE WHEELER & WILSON MANUFACTURING COMPANY, OF SAME PLACE.

MACHINE FOR TRIMMING AND STAMPING HORSESHOE-NAIL BLANKS.

SPECIFICATION forming part of Letters Patent No. 266,584, dated October 24, 1882.

Application filed March 30, 1882. (No model.)

*To all whom it may concern:*

Be it known that I, WILLIAM F. DURFEE, a citizen of the United States, residing at Bridgeport, in the county of Fairfield and State of Connecticut, have invented certain new and useful Improvements in Machinery for Trimming the Sides of and Stamping a Trade-Mark on Horseshoe-Nail Blanks, of which the following is a specification, reference being made to the accompanying drawings for a fuller and better understanding of the same.

For the purpose of showing the practical application of my invention, I have illustrated the same in the form of a machine for performing the trimming and stamping operations on double-ended blanks to be used in the manufacture of horseshoe-nails.

Referring to the drawings, Fig. 6 represents the mechanism as it appears when viewed from the right-hand side of the drawings. Figs. 1 and 4, (the supporting-frame being sl own in section,) and illustrates the stamping device.

In the several figures, A' represents a frame for supporting the base-plate A and its attachments.

B is a base-block secured to the base-plate A, and through it pass the two vertical and parallel guide-bars D D, which bars are connected at their lower extremities by the yoke C and at their upper extremities to the press-head H.

Figure 2:
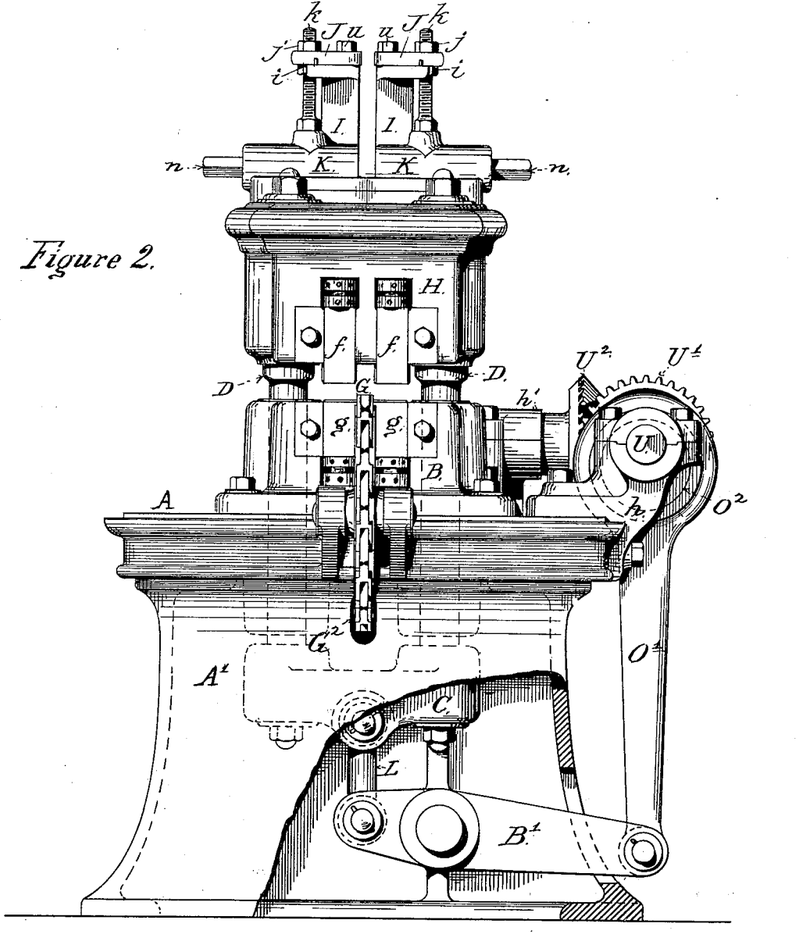
Fig. 2 is an end elevation of the machine, also drawn with a corner of the frame broken away for the purpose of showing the links and lever operating the press-head.
Figure 3:
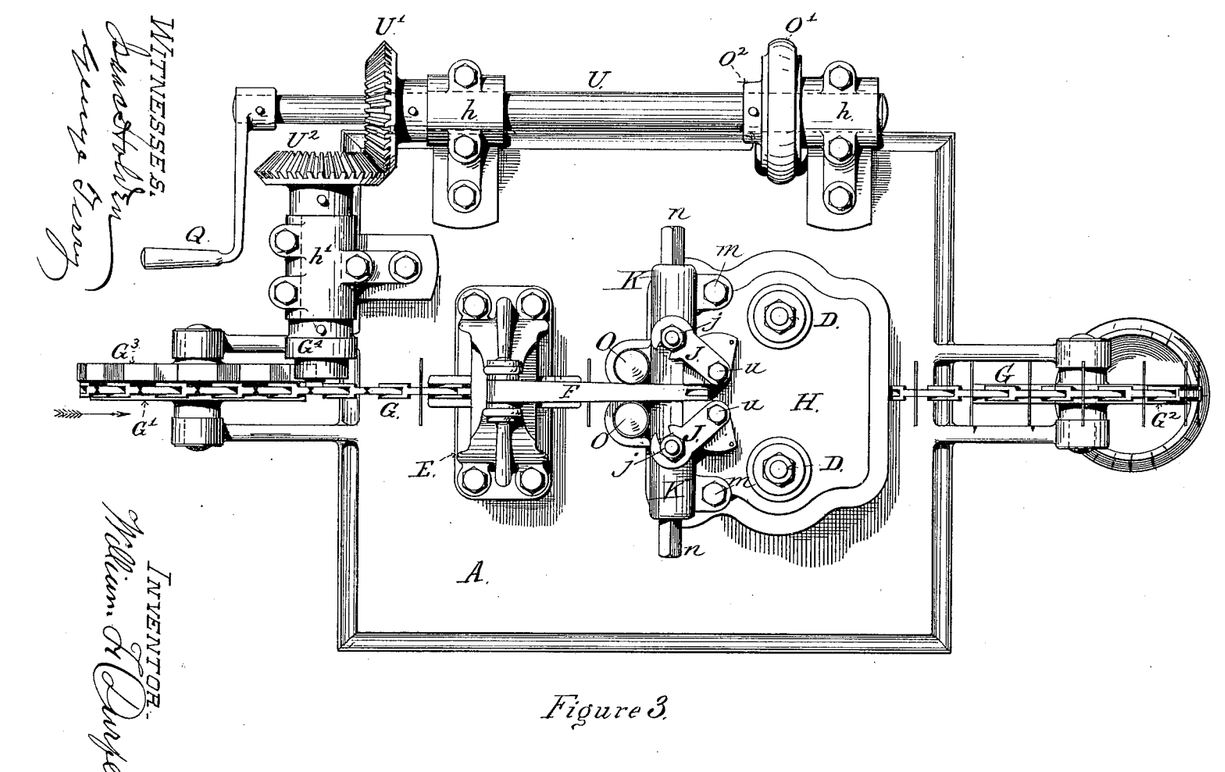
Fig. 3 shows a plan view of the machine, and illustrates the manner of communicating motion from the driving-shaft to the various parts.

U (see Figs. 1, 2, and 3) is the driving-shaft for operating the mechanism and rotates (by means of power applied at Q) in the bearings $h\ h$, attached to the base-plate A, its motion being communicated (through the miter-gears U' and $U^2$) to the short chain driving-shaft V, (see Figs. 1 and 3,) which revolves in the bearing $h'$, also attached to the base-plate A. The shaft U carries with it the eccentric $O^2$, which, through the rocking lever B' and links O' and L, communicates a vertical reciprocating movement to the yoke C and press-head H. (See Figs. 1 and 2.)

Figure 1:
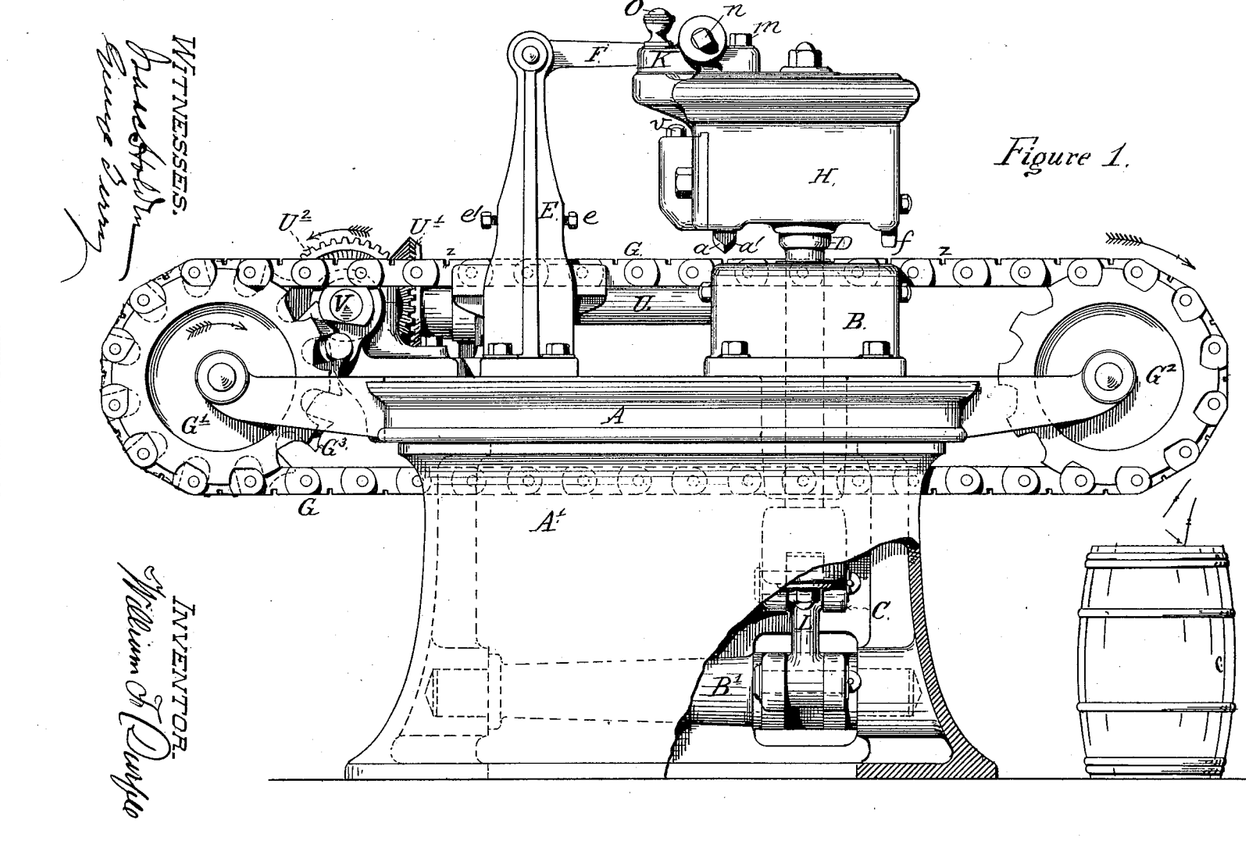
Figure 1 is a side elevation of the complete machine, the lower right-hand corner of the frame being removed to show more clearly a part of the operating mechanism.
Figure 10:
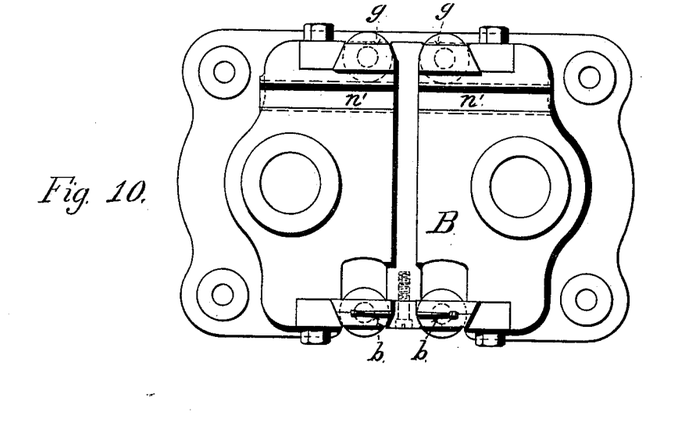
Fig. 10 represents a plan view of the base-block B with its attachments.

G, Fig. 1, is an endless conveying-chain, composed of a series of similar links, each having in its upper edge a notch, $z$, for the reception of the blanks on which the mechanism is to operate, said chain being carried on and by the two chain-wheels G' and $G^2$, (see Figs. 1, 2, and 3,) and is guided and supported in a groove formed in the upper side of the base-block B. (See Fig. 10.)

Figures 4, 14, 15, 16:
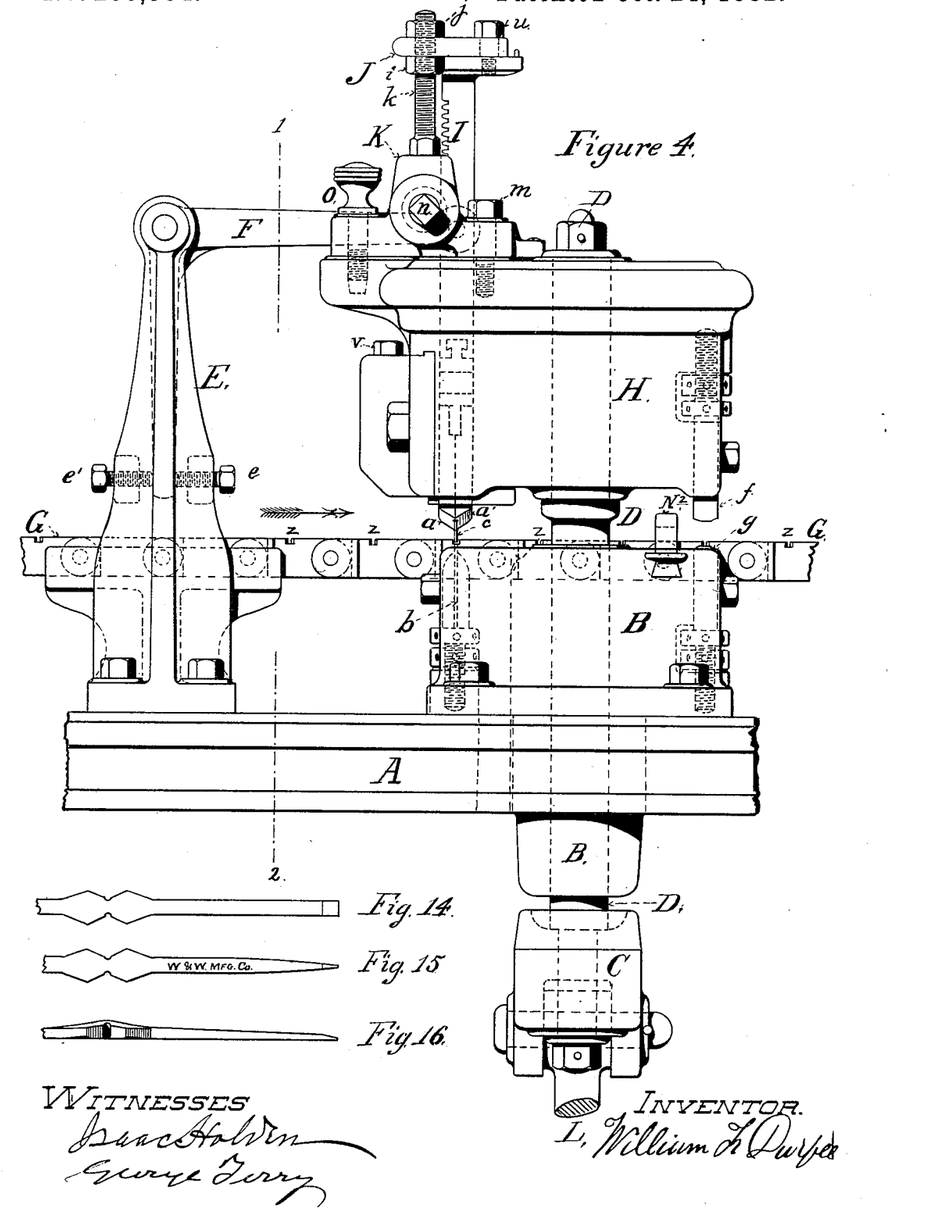
Fig. 4 is an enlarged side elevation of the trimming and stamping devices and the extractor, together with a fragment of the base-plate.
Fig. 14 shows the plan of the middle and right-hand end of a blank (enlarged as respects the scale of the machine itself) pending the action of the trimming device thereon.
Fig. 15 is a plan of the same blank after the said device has acted upon it, and also shows the work done by the stamping device.
Fig. 16 is an edge view of the blank illustrated in Figs. 14 and 15.
Figure 5:
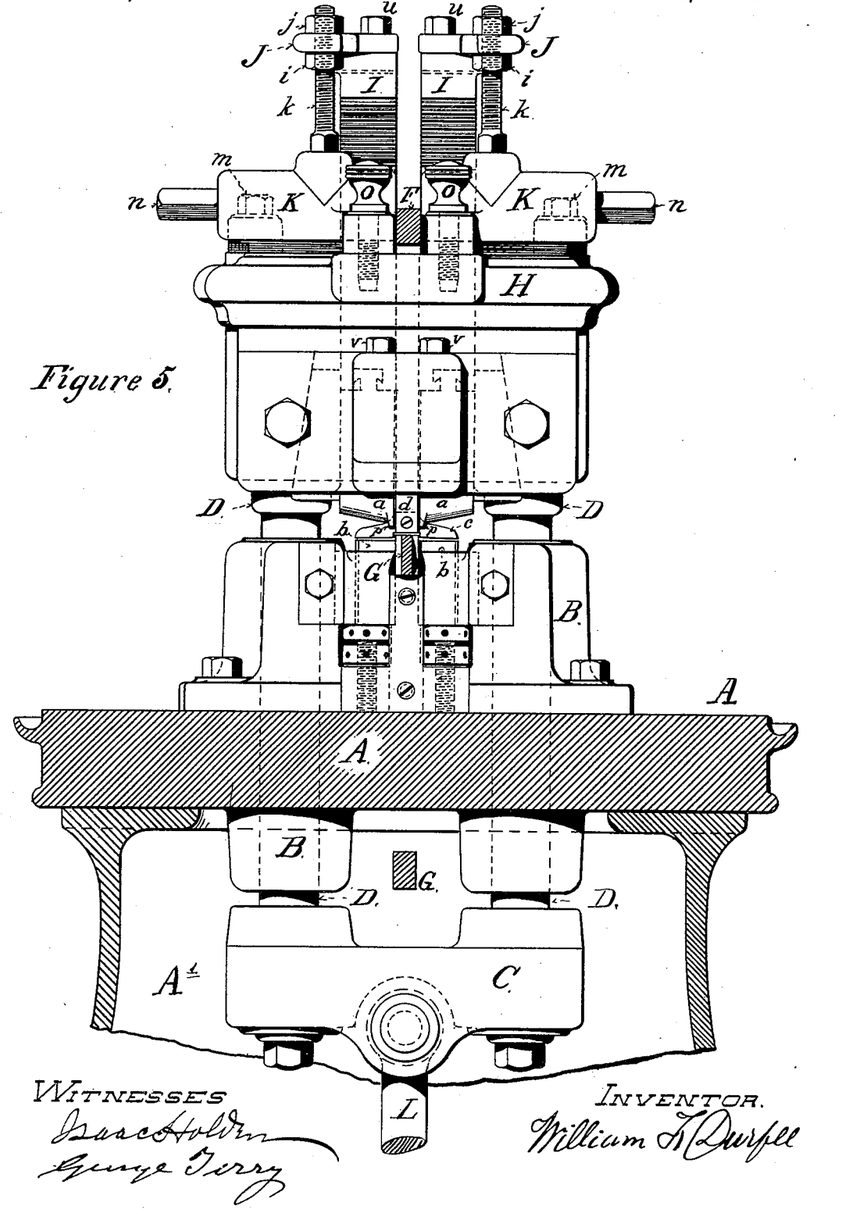
Fig. 5 is an enlarged end elevation or partial section of the preceding figure, taken on the line 1 2, and shows distinctly the trimming device.
Figure 6:
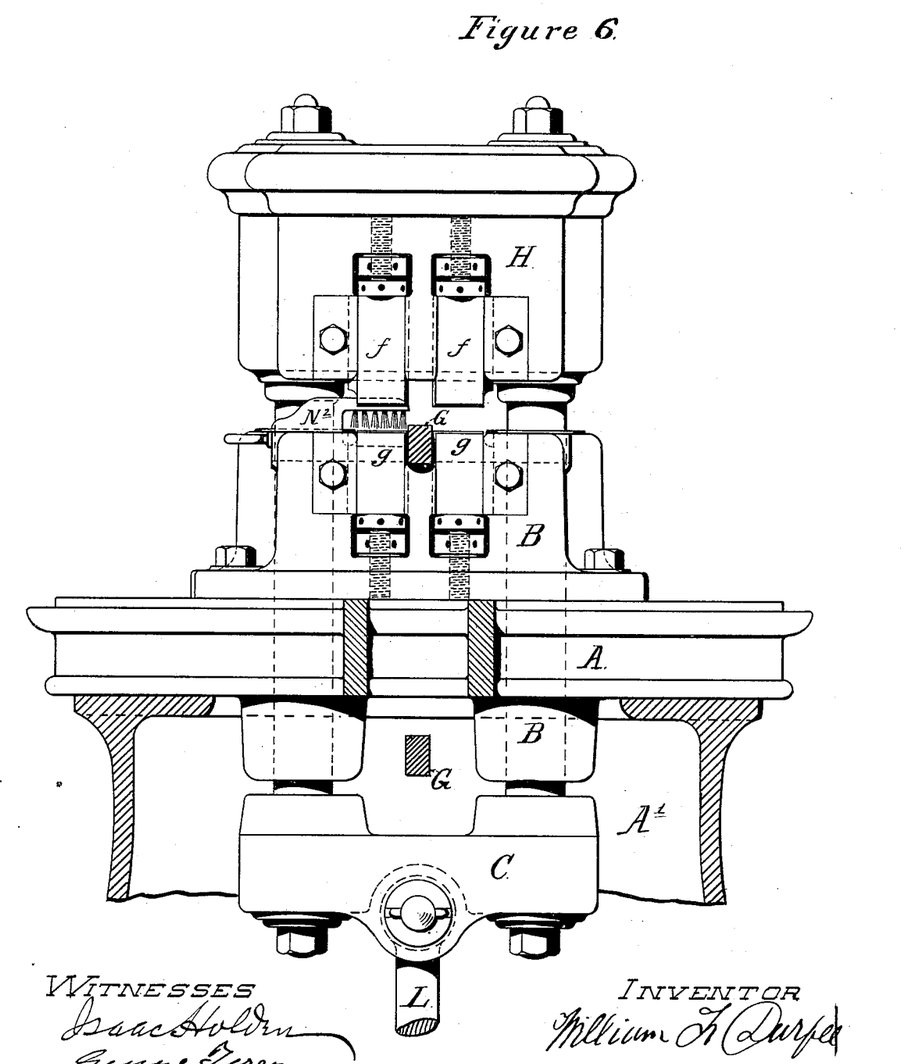

The operation of this combined mechanism is substantially as follows, to wit: The double-ended blanks to be operated upon are inserted in the notches $z$ of the conveying-chain G, either by hand or automatically, as said chain is caused to move intermittingly in the direction of the arrow, through the space of one link at each revolution of the driving-shaft U by the intervention of the short shaft V, carrying at its end the crank G⁴, which in the course of its revolutions engages successively with each of the radial slots formed in the circumference of the "star-wheel" G³, attached to the chain-wheel G'. (See Figs. 1 and 3.) After the blanks are inserted in the chain-links, as described, they are carried along by said chain until the extremities of one of said blanks come into position over the lower trimming-dies, b b, of Figs. 4 and 5 (which dies are of the same horizontal cross-section as the desired outline of the blank when trimmed, and are capable of vertical adjustment to compensate for the amount of metal removed from their upper surfaces by regrinding) and under the projecting wings c c at the lower extremity of the extractor-bar d, Figs. 4, 5, and 11, which bar is suspended from one end of the horizontal arm of the bell-crank lever F and passes vertically through an opening in the head H, in which it is adjusted in the direction of its length by means of the screws e e', bearing against the lower extremity of the vertical arm of the lever F aforesaid, said lever being pivoted in and supported by the standard E, provided for the purpose. When a blank is brought into the position aforesaid the press-head H is made to descend, as before described, until the projections p p, (see Figs. 5 and 9,) at the lower ends of the trimming-dies a a', embrace the blank on both sides of the chain, and thus locate it centrally on the lower dies, b b, aforesaid, so that the continuing descent of the head H will cause the dies to act upon and trim the edges of said blank, which will result in giving thereto an outline substantially as shown by Fig. 15, after which operation the head H is made to ascend, (preparatory to its acting upon another blank,) and in so doing will tend to lift the trimmed blank out from the notch z of the chain G. This, however, is prevented by the action of the stationary extractor d, whose projecting wings c c bear upon the upper surface of said blank, as hereinbefore described.

Figure 8:
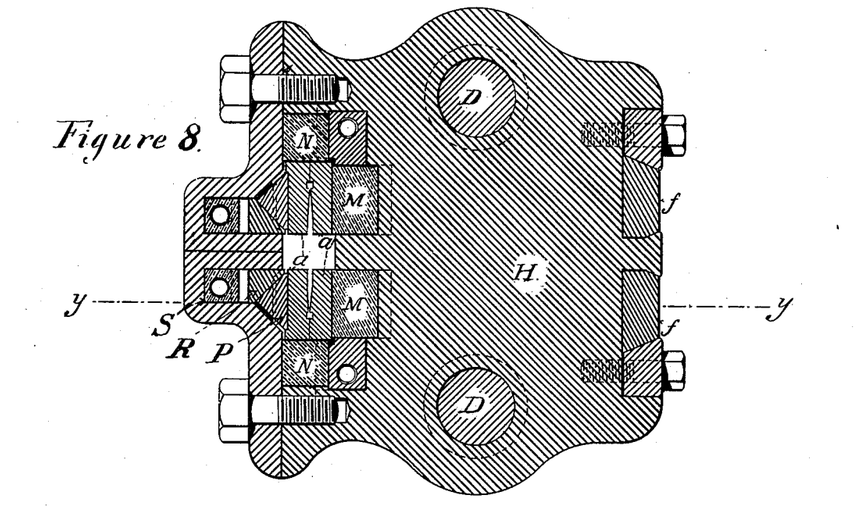
Fig. 8 shows an enlarged horizontal section of the press-head H, taken on a plane through $x\ x$ of Fig. 9.
Figure 9:
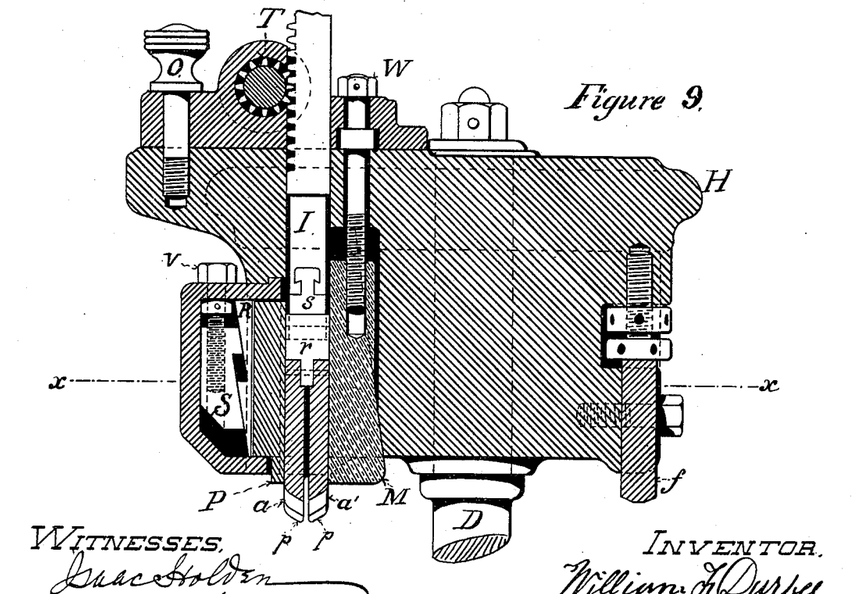
Fig. 9 is an enlarged vertical section of the same, taken on a plane through $y\ y$ of Figs. 7 and 8.
Figures 11, 12:
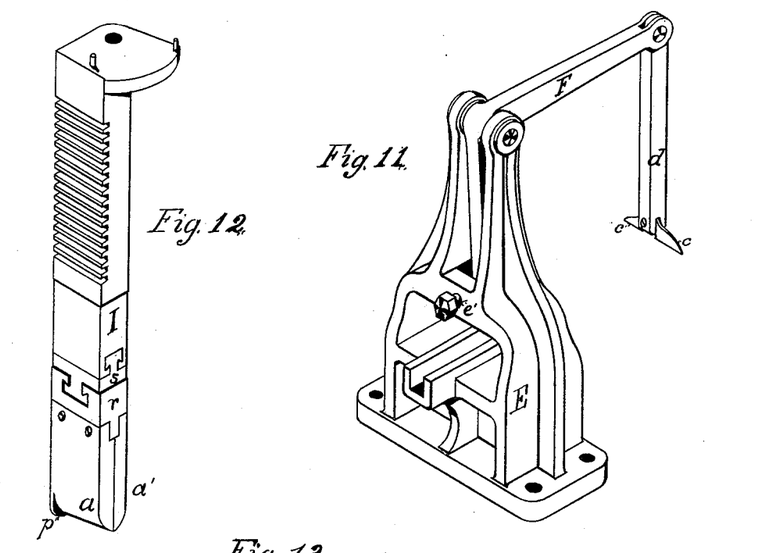
Fig. 11 shows the extractor-arm and its supporting-standard in perspective.
Fig. 12 shows the upper trimming-dies and their connection, with their adjusting rack-bar in perspective.

For convenience of adjustment and removal, I have constructed each of the upper trimming-dies in two parts, a and a', so as to leave a vertical space between them of the same form and dimensions as the horizontal cross-section of the under trimming-dies, already described, both of which parts a and a' are secured at their upper extremities to the block r, Figs. 9 and 12, said block being connected with the vertical rack-bar I by means of the universal sliding block s, which, while it governs the vertical position of the dies a a' relative to that of the rack-bar I, will permit said dies and block r to be moved freely in any direction in a horizontal plane for the purpose of adjusting the same directly above the under die, b, said adjustment being accomplished in the following manner: The cutting-dies a a', before described, are embraced by a series of blocks and wedges on three sides, so that if it be necessary to move said dies in the direction at right angles to the chain G, they may be so moved by first lowering the clamping-wedges S by means of the screws v, Figs. 8 and 9, an extent sufficient to loosen said dies and then raising or lowering the wedge-blocks N N by means of the screws t t until the dies aforesaid occupy the desired position, when they may be again secured by raising the clamping-wedges S. Again, if it were desired to move the dies a a' in a direction parallel with the conveying-chain G, the clamping-wedges S are lowered, as in the previous instance, and the wedge-blocks M M elevated or depressed by means of the screws W, provided for the purpose, so as to move the dies the required amount in the desired direction, after which they may be again secured by raising the clamping-wedges S. Thus it will be noticed that the clamping-wedges S operate to force the dies in two directions, owing to their acting at an angle of forty-five degrees to the flat faces of the wedge-blocks N and M through the intervention of the triangular blocks P, which not only have a bearing against the flat surfaces of the sides of the dies a, but their edges which are farthest from the chain G bear against a projection on said dies at right angles to the flat surface of their sides, before mentioned.

Figure 7:
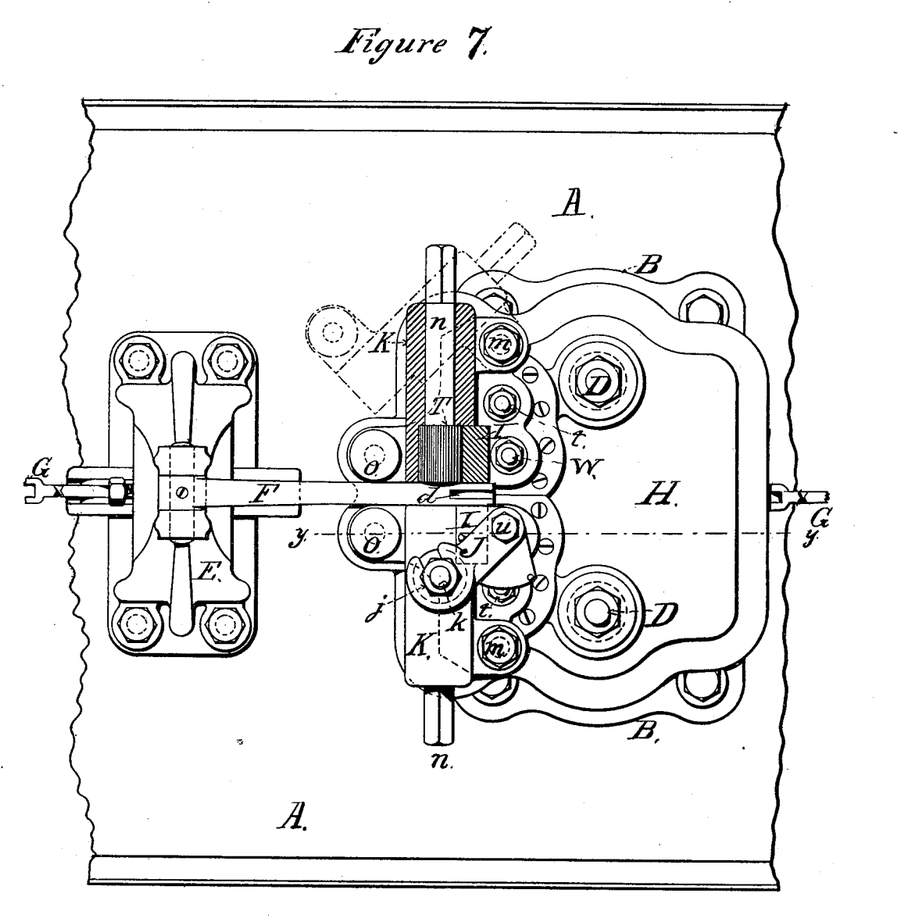
Fig. 7 is a plan view of Figs. 4, 5, and 6.

In order to further facilitate the adjustment of the dies a a', I have provided a means for giving to them a vertical movement independent from that given by the head H. The bars I, to which said dies are suspended, as before described, are provided with toothed racks, which engage with the pinions T of the horizontal shafts n, so that when said shafts are turned, by applying a lever or its equivalent to their squared extremities said dies may be raised or lowered. This movement is purely one of adjustment, and when the vertical position of the dies is determined upon they are secured in such position by means of the nuts i and j on the standing bolts k, which bolts pass through a notch in the hooks J, said hooks being capable of turning horizontally about the bolts u, by which they are connected to the upper end of the bars I. (See Figs. 5 and 7.)

Figure 13:
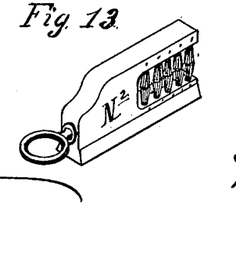
Fig. 13 is a perspective view of one of the cleaning-brushes which operate in connection with the mechanism.

In order to remove the dies a a' from the head H for the purpose of examination or repairs, I proceed in the following manner, to wit: First, the upper nut, j, on the standing bolt k, is slacked up, and the hook J is turned horizontally until its hooked end ceases to embrace the said standing bolt k; second, the pin O is unscrewed until its lower extremity is entirely removed from the head H; third, the bearing K, with its appurtenances, is turned horizontally about the bolt m as a center until it comes into the position represented by the dotted lines in Fig. 7, which action disengages the pinion T from the rack-bar I; fourth, the clamping-wedge S is slacked down, after which operation the rack-bar I and its attached dies may be readily removed vertically. When the blanks have been operated upon by the trimming device hereinbefore described they are, by a succession of movements of the chain G, carried between the removable cleaning-brushes N², for the purpose of removing any particles of metal or other foreign substance from their surfaces, said brushes being of a form similar to that shown in Fig. 13 and fitted in the dovetail grooves $n'$ $n'$ in the upper surface of the base-block B. (See Fig. 10.) After passing these brushes the blanks are brought by the continued movement of the chain into position on the lower anvil-dies, $g$ $g$, of the stamping device, which dies are located on the opposite side of the base-block B to that occupied by the lower dies of the trimming devices already described, so that when the head H is moved downward the upper vertically-adjustable stamping-dies, $f$ $f$, which carry the trade-mark stamp, and the lower vertically-adjustable anvil-dies, $g$ $g$, act on said blanks for the purpose of stamping the same with letters, figures, or symbols, after which they may appear as shown in Fig. 15 of the drawings.

Having thus described my invention, what I claim as new, and desire to secure by Letters Patent, is—

1. The combination of the vertically-movable press-head H, carrying upper trimming-dies, $a$ $a'$, and stamping-dies $f$ $f$, the vertical supporting and guide bars D D, the base-block B, provided with lower trimming-dies, $b$ $b$, and anvil-dies $g$ $g$, the blank-conveying chain G, and suitable operating mechanism, substantially as and for the purpose described.

2. The combination of the press-head H, vertically-adjustable bar I, upper trimming-dies, $a$ $a'$, and intermediate attaching-blocks, $r$ $s$, whereby said dies are made capable of an adjustment in any direction in a horizontal plane while the vertical bar remains stationary, substantially as and for the purpose described.

3. The combination of the press-head H, shaft $n$, carrying pinion T, the vertically-adjustable rack-bar I, and the upper trimming-dies, $a$ $a'$, all substantially as and for the purpose described.

4. The combination, with the dies of a cutting or trimming press, of a triangular block and a series of wedges adapted to act on three sides of said dies, said wedges being provided with suitable operative means, whereby the dies are secured and made capable of adjustment in any direction in a horizontal plane without obstructing their action, substantially as described.

5. The combination, with a blank-conveying chain and the upper and lower dies of a blank-trimming press, of a stationary extractor, $d$, provided with projecting wings $c$ $c$, substantially as and for the purpose described.

6. The combination, with the trimming-dies, of the standard E, bell-crank lever F, the adjusting devices $e$ $e'$, and the extractor $d$, attached to the horizontal arm of the lever, substantially as shown and described.

In testimony whereof I affix my signature in presence of two witnesses.

WILLIAM F. DURFEE.

Witnesses:
ISAAC HOLDEN,
GEORGE TERRY.